Aug. 28, 1962     G. G. FAYARD     3,051,386
MACHINE CONTROL DEVICE
Original Filed Nov. 7, 1955
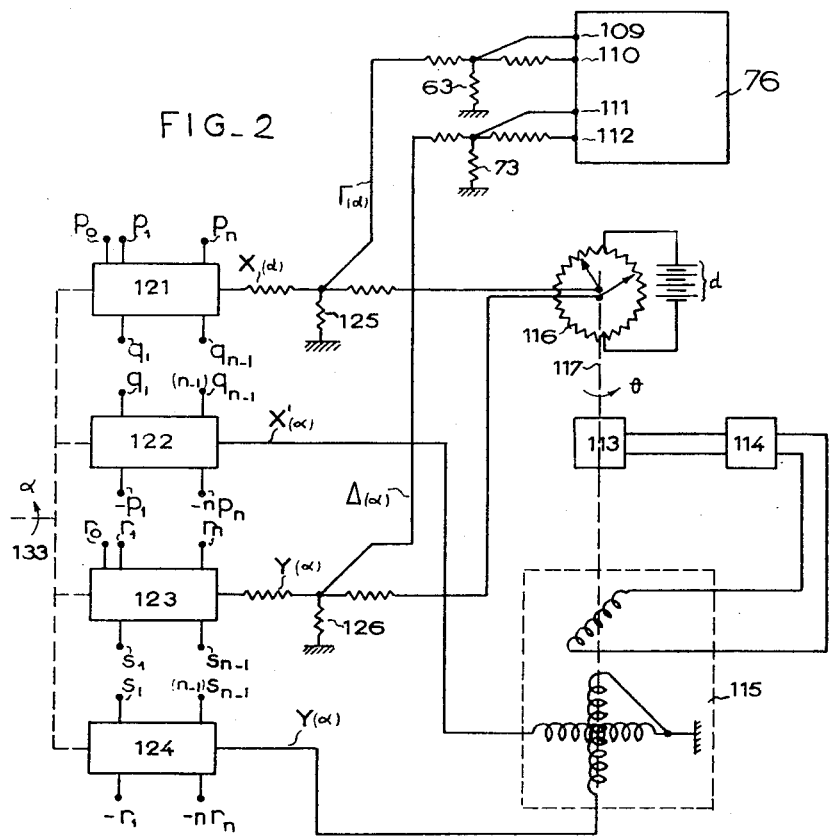
FIG_2
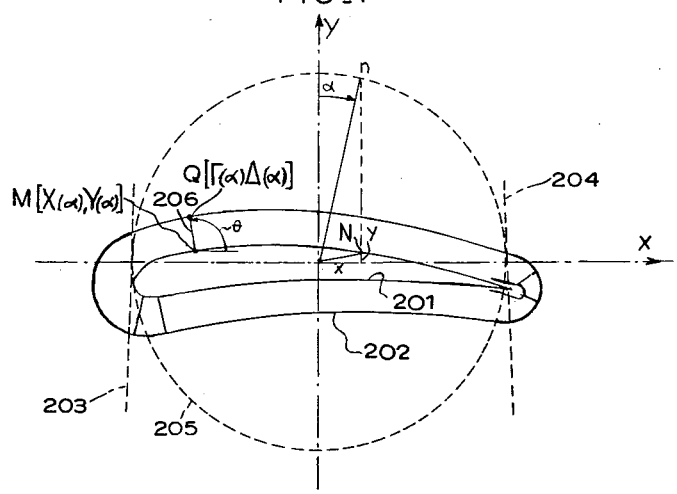
FIG_1
INVENTOR
GEORGES G. FAYARD
BY *A. A. Saffitz*
Attorney

United States Patent Office 3,051,386
Patented Aug. 28, 1962

3,051,386
MACHINE CONTROL DEVICE
Georges G. Fayard, Paris, France, assignor to Office National d'Etudes et de Recherches Aéronautiques, Chatillon-sous-Bagneux, France, a company of France
Original application Nov. 7, 1955, Ser. No. 545,397. Divided and this application Oct. 10, 1958, Ser. No. 766,472
Claims priority, application France Mar. 28, 1955
2 Claims. (Cl. 235—151)

This application is a division of my copending application Serial No. 545,397, filed November 7, 1955.

The present invention relates to automatically controlled machines, for example machines for the shaping of turbine blades and the like.

The invention provides a machine of this type which dispenses with memory devices for the shapes of patterns such as cams to be followed by a feeler or magnetic or perforated tapes which record a function of space for reproduction by the machine. Instead the machine requires only that the curve to be followed by the cutting tool be known in the form of a parametric equation, or alternatively that the coordinates of a finite number of points on the curve be known.

In general terms a turbine blade or a compressor or propeller blade can be considered as being made up of a plurality of right angle cylinders each having altitude of any desired degree of smallness when stacked together. The shape and the dimensions of the cross sections of these right angle cylinders, hereinafter to be called "profiles," generally varies from one cylinder or cylindrical element of the blade to the next. Of course it is also possible for the shape and dimensions of the successive profiles to remain constant, being simply displaced angularly with respect to each other.

The path followed by the cutter in milling a profile is a closed curve parallel to the profile, and it will hereinafter be referred to as the "parallel curve." The profile itself may for example be of convex cylindrical type of two sections.

This parallel curve can usually be defined in Cartesian or polar parametric coordinates which can be developed in the form of a Fourier series limited to a certain number of terms. A complete description of the curve is obtained by causing the parameter to vary between zero and $2\pi$. If the curve is defined by $p$ points, the number of terms $2n$ of the limited series is equal to the number $p$ of points which are given for representation of the parallel curve in question.

I have found experimentally that it is possible to suitably choose the parameter in terms of which the Cartesian or polar coordinates of the parallel curve are to be expressed in order to obtain a Fourier's series expressed in terms of said coordinates, said series representing, with a rather small number of terms and within a good limit of accuracy, the actual values of said coordinates. The reduction to practice of the invention is based on this fact and the particulars on the parameter choice will be given hereinafter.

The invention relates also to the production of workpieces whose profiles are not closed such as the shaping of grooves or special cams. It is sufficient in such cases to join the ends of the desired profile curve by a suitable contour and to operate the command mechanism for the machine tool provided by the invention only between particular values of the parameter pertaining to the profile desired to be achieved while disabling it for other values of the parameter. Similarly the invention is applicable to the machining in part or whole of dies intended for stamping of metal sheets such as those used in automobile bodies. In such applications the invention obviates the use of the elaborate plaster models hitherto employed with a feeler for machining of dies in the automobile body industry.

The desired developments of the profile coordinates into limited Fourier series can be obtained by computation. Alternatively the coefficients of these developments can be obtained automatically by the apparatus of the invention itself. For this purpose the profile data comprise not the coefficients of the limited Fourier developments but the parametric coordinates of a certain number of points on the profile curve and the parametric values which correspond thereto. The coefficients of the Fourier developments being thus determined, the curve represented in parametric coordinates by these developments passes exactly through all of the given points but cannot coincide between such points with the theoretical curve. A better degree of coincidence is obtained of course with a larger number of data points to begin with but particularly by a proper choice of the data points along the parallel curve.

The apparatus of the invention comprises harmonic synthesizers and eventually harmonic analyzers.

Harmonic analyzers and synthesizers are well known in the art. See for example "Harmonic Analyzer and Synthesizer" by Jules Lehmann, Electronics, November 1949, pages 106–110 and "A One-Dimensional Fourier Analog Computer" by Leonid V. Azaroff, The Review of Scientific Instruments, May 1954, pages 471–477. These devices comprise essentially sinusoidal multiplying potentiometers or synchro-transformers. The parameter values in the terms to be added are arranged in arithmetic progression and can be simultaneously materialized by means of shafts coupled through gearing systems having ratios arranged in arithmetic progression to a common shaft (basic shaft) whose rotation represents the variation of the parameter itself. The sum of the products can be instantaneously obtained by adding in a common resistance the output voltages of the various potentiometers or synchros. In the case of the synthesizer the parameter varies continuously from zero to $2\pi$ and the basic shaft turns continuously. In the case of the analyzer the parameter takes on a series of discrete values which are multiples of a quantity $\alpha_1$, and the basic shaft is successively turned to positions inclined to a zero orientation by one of these discrete values.

Sinusoidal potentiometers are well known and are available in various types. It is possible for example to use those described in U.S. Patent No. 2,434,057 which comprises essentially a coil mounted flat on a rectangular insulating plate and a rotating wiper whose axis passes through the intersection of the diagonals of the plate. Harmonic synthesizers and analyzers of various type are described in the abovementioned application Serial No. 545,397, in which is described a machine control device machining onto a work piece a profile known by the curve parallel to said profile as defined above.

The object of the present invention is to provide a control device for a machine tool in which the positioning of the cutting tool and hence of the fixture which supports it, is obtained by reference to harmonic analysis of the desired profile curve itself instead of harmonic analysis of the curve which is parallel to the desired profile which is the path of the center or axis of a rotating cutting tool. In this connection it will be observed that the distance between homologous points on the parallel curve and on the profile itself measured along the normal to the profile is constant. The direction coefficients of this normal are proportional to the derivatives of the coordinates of points on the desired profile, taken with respect to the angular parameter. Since the coordinates are given in the form of limited Fourier series development, these direction coefficients are themselves proportional to the Fourier series development of the same order of limit which it is easy to obtain with new harmonic synthesizers. Electrical adding networks which add the voltages proportional to the coordinates of a point on the profile to suitably calibrated voltages proportional to the direction coefficients of the normal to the profile give as sums voltages proportional to the coordinates of the point on the parallel curve which is homologous to the point on the profile itself under consideration.

The invention will now be described in detail by reference to the accompanying drawings in which:

FIG. 1 illustrates how the coordinates of a point of the curve parallel to the profile may be obtained from the coordinates of the corresponding point of the profile itself and FIG. 2 is a schematic diagram, partly in block form, of apparatus according to the invention for control of the machine tool positioning elements according to harmonic analysis of the desired profile itself instead of analysis of the curve parallel thereto.

Referring to FIG. 1, 201 designates an aerodynamic profile, 203 and 204 two straight lines tangent to the profile near the leading and trailing edges of the same and parallel therebetween and 205 is a circle tangent to both lines 203 and 204 and having its center somewhere inside the profile, the exact location of said center having no significance. As more fully explained in my copending application Serial No. 545,397, I prefer to choose as parameter of the current point N on the profile the angle $\alpha$ which is the polar angle of a point $n$ on circle 205 having the same abscissa X as point N on profile 201. With such a choice the Fourier's series representative of the abscissa of point N has only one sine term:

$$X(\alpha) = R \sin \alpha$$

R being the radius of circle 205 and I have found that the Fourier's series representative of the ordinate of point N give quite a good approximation of the actual ordinate value in a number of terms which are rather small and indeed very much smaller than that which would be necessary if the chosen parameter were the polar angle of point N itself.

Although I have explained that, in the case I choose the angle $\alpha$ of FIG. 1 as the parameter, the abscissa of the Fourier's series development has only one sine term, I do not desire to restrict my invention to such case and I have developed the parametic expressions of the abscissa and ordinate of point N in accordance with the following:

$$X(\alpha) = p_0 + p_1 \cos \alpha + q_1 \sin \alpha + \ldots + p_{n-1} \cos (n-1)\alpha + q_{n-1} \sin (n-1)\alpha + p_n \cos n\alpha$$
$$Y(\alpha) = r_0 + r_1 \cos \alpha + s_1 \sin \alpha + \ldots + r_{n-1} \cos (n-1)\alpha + s_{n-1} \sin (n-1)\alpha + r_n \cos n\alpha$$

(it must be noted that each series has $2n$ terms and particularly $(2n+1)$ cosine terms and $(2n-1)$ sine terms since, when the series coefficients are derived from data constituted by the abscissae and ordinates of $p$ points on the profile, we must have $2n=p$; but we might as well take $n$ cosine terms and $n$ sine terms).

The direction ratios of the normal 206 at the current point M on the profile (two current points M and N are shown to improve the readableness of the drawings are:

$$-dX(\alpha)/d\alpha = p_1 \sin \alpha - q_1 \cos \alpha + \ldots + (n-1)p_{n-1} \sin (n-1)\alpha - (n-1)q_{n-1} \cos (n-1)\alpha + np_n \sin n\alpha$$
$$dY(\alpha)/d\alpha = -r_1 \sin \alpha + s_1 \sin \alpha - \ldots - (n-1)r_{n-1} \sin (n-1)\alpha + (n-1)s_{n-1} \cos (n-1)\alpha - nr_n \sin n\alpha$$

It may be seen from FIG. 1 that the coordinates $\Gamma(\alpha)$ and $\Delta(\alpha)$ of the point Q on the parallel curve 202 are derived from the coordinates $X(\alpha)$ and $Y(\alpha)$ of a point M on the profile 201 itself by the following relations:

$$\Gamma(\alpha) = X(\alpha) + d \cos \theta$$
$$\Delta(\alpha) = Y(\alpha) + d \sin \theta$$

where $\theta$ is the angle of the straight line MQ with the X axis and $d$ is the separation of the profile 201 and the parallel curve 202.

Referring now to FIG. 2, 121, 122, 123 and 124 designate four synthesizers driven by the shaft 133 whose rotation represents $\alpha$. These synthesizers develop voltages respectively proportional to $X(\alpha)$, $X'(\alpha)$, $Y(\alpha)$, $Y'(\alpha)$. A motor 113 drives the shaft 117 of a sine potentiometer 116 having two rectangular sliders, and motor 113 also drives the rotor of a selsyn 115. The two stator windings of this selsyn are energized with voltages which are respectively proportional to $X'(\alpha)$ and $Y'(\alpha)$. The rotor winding supplies an output voltage to an amplifier 114 whose output in turn is applied to motor 113. Consequently the shaft 117 assumes a position inclined to a zero position by an angle given by $$\tan \theta = \frac{X'(\alpha)}{Y'(\alpha)}$$

Likewise the rotor of the selsyn 115 assumes a position corresponding to the slope of the normal to the profile 201.

The output voltages available at the sliders of the sine potentiometer 116 are therefor respectively proportional to $\cos \theta$ and to $\sin \theta$. They are added, together with voltage representing $X(\alpha)$ and $Y(\alpha)$ in resistors 125 and 126. These resistors thus make available voltages which represent the coordinates of a point on the curve 202 which is parallel to the desired profile. These voltages are applied to subtraction networks 63 and 73 and, thence to the input terminals 109—110 and 111 and 112 of the servomechanisms of the machine 76. Servomechanisms for controlling the position of the cutter of a machine tool with respect to the workpiece in function of signals representative of the abscissa and ordinate of the center of said cutter are fully disclosed in the above-mentioned copending application Serial No. 545,397 in connection with FIG. 6 of the same. The machine is thus controlled by harmonic analysis not of a subject computed curve parallel to the desired profile along which the cutter axis must move, but by harmonic analysis of the desired profile 201 itself.

What I claim is:

1. Apparatus for producing continuously varying signals representative of the abscissa and ordinate of a first-closed profile parallel to a second closed profile defined by a set of values representative of the coefficients of a limited number of terms in two Fourier series describing respectively the variation of the abscissa and ordinate along said second profile as a function of a cyclically varying parameter comprising first and second harmonic synthesizers being arranged to develop from signals proportional to said coefficient values and from said parameter output signals proportioned to the values of said abscissa and ordinate series, third and fourth harmonic synthesizers arranged to develop from signals proportional to said coefficient values and from said parameter output signals proportional to the values of the differentials of said abscissa and ordinate series with respect to said parameter and means for adding the output signals of said first and fourth harmonic synthesizers and the output signals of said second and third harmonic synthesizers.

2. Apparatus for producing continuously varying signals representative of the coordinates of a first closed profile parallel to a second closed profile defined by a finite number coefficient Fourier series developments of two coordinates X and Y as functions of a continuously varying parameter α, comprising two first synthesizer means for developing voltages representative each of one of said coordinates X and Y as a function of said continuously varying parameter α, two second synthesizer means adapted each to develop a voltage representative of the derivative of one of said coordinates with respect to said parameter α, synchro-generator means receiving as inputs the outputs from said second synthesizer means whereby the shaft thereof takes up the position of an angle whose tangent is equal to the ratio of said derivatives, means coupled to said shaft to develop voltages proportional to the sine and cosine of said angle, and separate voltage adding means adapted each to add the output of one of said first synthesizer means to one of said sine and cosine voltages.

References Cited in the file of this patent

UNITED STATES PATENTS

| | | |
|---|---|---|
| 2,436,178 | Rajchman | Feb. 17, 1948 |
| 2,436,891 | Higinbotham | Mar. 2, 1948 |
| 2,660,700 | Gates | Nov. 24, 1953 |
| 2,841,332 | Lees | July 1, 1958 |
| 2,883,110 | Spencer et al. | Apr. 21, 1959 |

FOREIGN PATENTS

| | | |
|---|---|---|
| 740,071 | Great Britain | Nov. 9, 1955 |